US007158492B2

(12) United States Patent
Haverinen

(10) Patent No.: US 7,158,492 B2
(45) Date of Patent: Jan. 2, 2007

(54) LOAD BALANCING IN TELECOMMUNICATIONS SYSTEM SUPPORTING MOBILE IP

(75) Inventor: Henry Haverinen, Tampere (FI)

(73) Assignee: Nokia Corporation, Espoo (FI)

( * ) Notice: Subject to any disclaimer, the term of this patent is extended or adjusted under 35 U.S.C. 154(b) by 762 days.

(21) Appl. No.: 09/803,943

(22) Filed: Mar. 13, 2001

(65) Prior Publication Data

US 2001/0021175 A1 Sep. 13, 2001

(30) Foreign Application Priority Data

Mar. 13, 2000 (FI) ................................. 20000574

(51) Int. Cl.
*H04Q 7/00* (2006.01)
(52) U.S. Cl. ...................................... 370/328; 370/237
(58) Field of Classification Search ................ 370/216, 370/217–221, 225, 227, 228, 229–235, 310.2, 370/338, 328, 349, 310, 428, 395.3, 270, 370/331, 237, 332, 329; 709/105, 245; 455/433, 435.1, 436, 439, 442
See application file for complete search history.

(56) References Cited

U.S. PATENT DOCUMENTS

| 5,446,739 | A | | 8/1995 | Nakano et al. |
| 5,473,599 | A | | 12/1995 | Li et al. |
| 6,115,463 | A | * | 9/2000 | Coulombe et al. ........... 379/230 |
| 6,195,705 | B1 | * | 2/2001 | Leung ......................... 709/245 |
| 6,430,698 | B1 | * | 8/2002 | Khalil et al. .................... 714/4 |
| 6,707,809 | B1 | * | 3/2004 | Warrier et al. .............. 370/351 |
| 6,738,362 | B1 | * | 5/2004 | Xu et al. ..................... 370/329 |
| 6,771,623 | B1 | * | 8/2004 | Ton ............................ 370/331 |

FOREIGN PATENT DOCUMENTS

| EP | 917 328 | 5/1999 |
| JP | 05336061 | 12/1993 |
| WO | WO 99/31853 | 6/1999 |
| WO | WO 00/51309 | 8/2000 |
| WO | WO 01/06734 | 1/2001 |

OTHER PUBLICATIONS

Jue et al., "Design and Analysis of a Replicated Srver Architecture for Supporting IP Host Mobility," Mobile Computing and Communications Review, vol. 2, No. 3, Jul. 1, 1998, pp. 16-23.
Jue et al., "Design and Analysis of Replicated Servers to Support IP-Host Mobility in Enterprise Networks," IEEE International Conference on Montreal, Quebec, Canada, Jun. 8-12, 1997, New York, pp. 1256-1260.
Network Working Group, IBM, "IP Mobility Support," Oct. 1996, Request for Comments: 2002, 70 pp.
Network Working Group, IBM, "Minimal Encapsulation Within IP," Oct. 1996, Request for Comments: 2004, 6 pp.
Network Working Group, IBM, "Mobile-IPv4 Configuration Option for PPP IPCP," Feb. 1998, Request for Comments: 2290, updates 2002, 15 pp.

* cited by examiner

*Primary Examiner*—Brenda Pham
(74) *Attorney, Agent, or Firm*—Pillsbury Winthrop Shaw Pittman LLP

(57) ABSTRACT

A method for load balancing in a telecommunications system supporting Mobile IP, the system including at least one mobile node and at least one home agent. The home agent mainly supporting the mobility of the mobile node is defined as the primary home agent and one or more secondary home agents are added to the telecommunications system. Packets destined for the mobile node are transmitted, when needed, via one or more secondary home agents.

15 Claims, 2 Drawing Sheets

LOAD BALANCING IN TELECOMMUNICATIONS SYSTEM SUPPORTING MOBILE IP

BACKGROUND OF THE INVENTION

The invention relates to load balancing in packet switched telecommunications systems, and particularly to load balancing in telecommunications systems supporting Mobile IP (Internet Protocol).

During the past few years the mobility of employees has steadily been on the increase and nothing indicates that the trend would change. To connect a mobile node to an IP network poses a variety of problems, however. As a solution to this problem, the Mobile IP working group within the Internet Engineering Task Force (IETF) has defined an IP mobility protocol, i.e. Mobile IP protocol in specifications RFC2002 to RFC2004 and RFC2290. Reference is made to FIG. 1 which shows a telecommunications system supporting the Mobile IP protocol. Mobile IP is a mechanism for providing telecommunications features to a user of a mobile node by means of an IP address. It allows mobile nodes MN to change their access point to the Internet without changing their IP address. Thus, it facilitates the communication of the mobile node MN and a corresponding host CH communicating therewith with the home address of the mobile node MN.

Within the scope of the present application a "mobile node" MN refers to a host that wishes to use a home network HN address while being connected to any network other than the home network HN. For example, this may be point-to-point connecting by using e.g. telephone, ISDN or cellular connections or connecting through an access network that is connected to the Internet via a router, such as a wireless local area network (WLAN) hot spot. The "home network" HN is possibly a virtual IP network, to which the user of the mobile node MN logically belongs. In physical terms, it can be e.g. a local area network LAN which is connected to the Internet via a router. The "home address" is an address that is assigned for an extended period of time to a mobile node MN. It may remain unchanged regardless of where the mobile node MN is connected to the Internet. Alternatively, it can be assigned from an address pool. The "home agent" HA is a routing entity in the mobile node's MN home network HN which forwards packets by tunneling to the mobile node MN while this is away from the home network HN and maintains current location information of the mobile node MN. Tunneling refers to forming a virtual link, a tunnel, between the nodes.

If the mobile node MN, when being activated or moving, detects that it is in a visited network VN, it can register via a "foreign agent" FA with the home agent HA and Mobile IP functionality can be activated. The foreign agent FA refers to a routing entity in the mobile node's MN visited network VN which provides routing services to the mobile node NM while registered, and thus allows the mobile node MN to utilize its home network HN address. The foreign agent FA transmits to the mobile node MN packets tunneled by the home agent HA. For packets sent by the mobile node MN the foreign agent FA can serve as a default router of registered mobile nodes MN.

RFC2002 defines a care-of address COA as a termination point of a tunnel toward a mobile node MN for packets to be transmitted to a mobile node MN in a visited network VN. The mobile node MN can receive advertisement messages comprising COA from foreign agents FA. One foreign agent FA can produce more than one COA in its advertisement messages. The mobile node MN registers its COA with the home agent HA by sending a registration request. The home agent HA responds with a registration reply and maintains mobility binding for the mobile node MN. "Mobility binding" is the association of a home address with a care-of address COA, along with the remaining lifetime of that association. The mobile node MN may have a plurality of COAs simultaneously.

Scalability of the Mobile IP protocol is often doubted, in particular as regards the home agents. If an organisation administering the home network has a considerable number of mobile nodes, there have to be a plurality of home agents as well. By current methods, the mobile nodes have to be configured separately by the home agent, and consequently addition of home agents for load balancing requires manual updating. For instance, if it is noted that the installed home agents cannot cope with the load produced by the mobile nodes, a new home agent has to be installed in the network and some of the mobile nodes have to be configured to use the new home agent.

BRIEF DESCRIPTION OF THE INVENTION

The object of the invention is to provide improved load balancing in telecommunications systems supporting Mobile IP. This is achieved with the method and telecommunications system which are characterized by what is disclosed in the independent claims. The preferred embodiments are disclosed in the dependent claims.

The invention is based on the idea that a telecommunications system supporting Mobile IP comprises, in addition to a primary home agent supporting at least one mobile node, at least one secondary home agent that can be arranged, when needed, to transmit packets destined for said at least one mobile node. Any home agent that substantially has the main responsibility for providing home agent functionality to a mobile node in a visited network can be determined as the primary home agent. A secondary home agent can be any agent functionality that can be arranged to transmit the packets destined for a mobile node on behalf of the primary home agent.

Packet transmission via secondary home agents, when needed, has an advantage that the load of the primary home agents can be flexibly balanced, even on the move, even though the mobile nodes were already registered. The system administrator can readily add new secondary home agents to share the load just by changing the primary home agent settings. This saves a laborious task of changing the settings of mobile nodes MN.

According to one preferred embodiment of the invention the primary home agent processes messages, such as registration requests, sent from a mobile node or from a foreign-agent serving the mobile node in a visited network. If an acceptable registration request is received from the mobile node or from the foreign agent serving the mobile node in the visited network, the primary home agent sends a routing request to a secondary home agent for transmitting packets destined for said at least one mobile node. The secondary home agent is arranged to intercept and tunnel the packets destined for said at least one mobile node in response to the registration request. This preferred embodiment has the advantage that the primary home agent always controls the provision of Mobile IP services to a mobile node, and when needed, it can assign packet transmission tasks to secondary home agents. Since the handling of actual mobile IP messages requires considerably less processing capacity than the interception and tunneling of packets, the primary home agent PHA can serve a considerable number of mobile nodes. This enables a considerable addition of new mobile nodes for the same primary home agent to serve.

According to another preferred embodiment of the invention the primary home agent collects loading information by monitoring the number of packets transmitted and, to balance the load, the packets destined for a mobile node are transmitted via a secondary home agent if the number of packets exceeds a predetermined threshold value. This has an advantage that the load can automatically be distributed to secondary home agents when the load of the primary home agent increases sufficiently.

According to yet another preferred embodiment the source address of packets transmitted from a secondary home agent is the IP address of the primary home agent and the destination address is the care-of address of the mobile node. This embodiment has an advantage that the mobile node and/or foreign agent assumes to be operating with a single home agent according to the Mobile IP protocol and no changes in the operation or Mobile IP of the mobile node and/or foreign agent are needed.

BRIEF DESCRIPTION OF THE DRAWINGS

In the following the invention will be described in greater detail in connection with preferred embodiments, with reference to the attached drawings, in which.

DETAILED DESCRIPTION OF THE INVENTION

Figure 1:
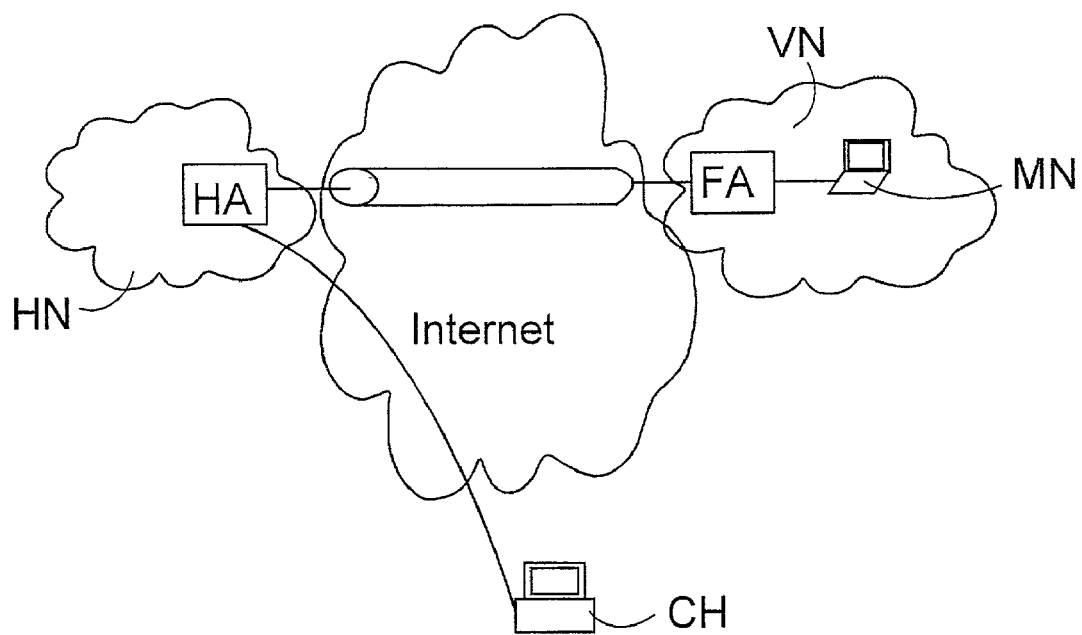
FIG. 1 illustrates a prior art telecommunications system utilizing Mobile IP.
Figure 2:
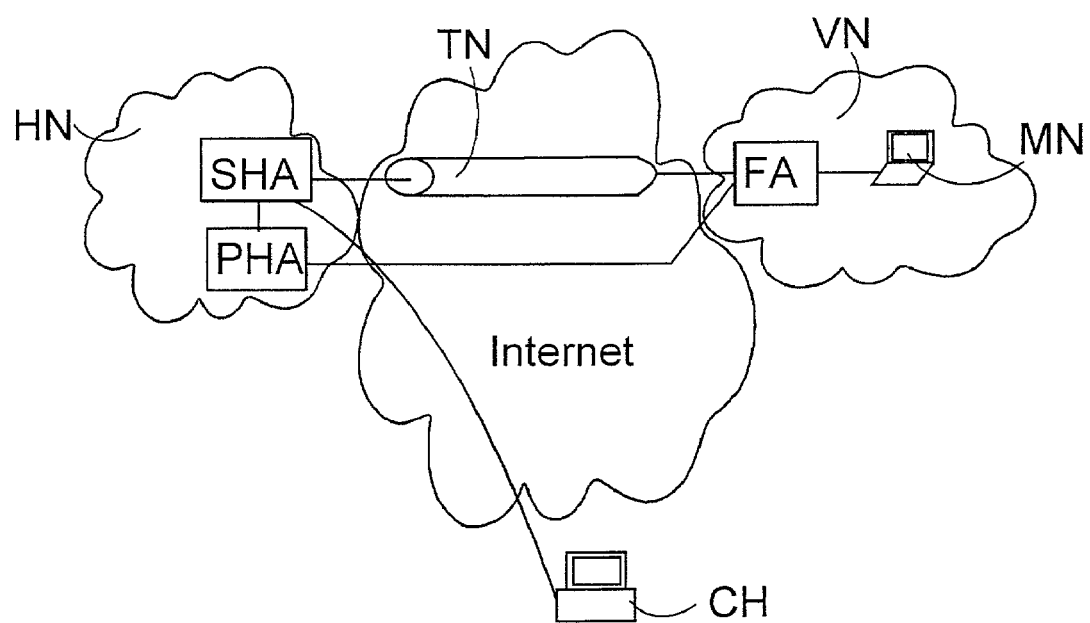
FIG. 2 illustrates a telecommunications system utilizing Mobile IP in accordance with one preferred embodiment of the invention.

The invention can be applied to any telecommunications system utilizing Mobile IP. FIG. 2 illustrates a telecommunications system supporting Mobile IP in accordance with one preferred embodiment.

A home network HN is the home network of a mobile node MN and provides a home address for MN. A visited network VN is any telecommunications network that can provide the mobile node MN an access to the Internet. The visited network VN can comprise one or more foreign agents FA. Various wired or wireless connection establishment techniques, and also various networks, can be used between the mobile node MN and the home network HN or between the mobile node MN and the visited network VN. A connection can be established by utilizing e.g. telephone, ISDN, local area network (LAN) or cellular connections.

The mobile node MN may comprise functionality for establishing a connection to a wireless local area network (WLAN). From access points of the wireless local area network it is possible to establish a wired connection to other parts of the network (HN, VN) and further to the Internet. MN can also be a mobile station supporting a mobile telecommunications system, such as the third generation UMTS system (Universal Mobile Telecommunication System). In this case, the visited network VN and the home network HN can be networks comprising a general packet radio service GPRS. Thus the agents PHA, SHA and FA can advantageously be located in connection with GGSN support nodes (GPRS Gateway Support Node).

According to a preferred embodiment, the home agent mainly supporting a mobile node MN is called a primary home agent PHA. As will be described below, PHA can provide the same services as a typical Mobile IP home agent, but when needed, it can delegate its tasks to one or more secondary home agents SHA. At the request of the primary home agent PHA, the secondary home agents SHA take care of the actual packet transmission to the mobile node MN, i.e. advantageously the interception and tunneling of the packets destined for the mobile node MN. Thus the packets sent to the home address of the mobile node MN by a corresponding host can be transmitted to a visited network VN.

The agents PHA, FA advertise their presence by sending advertising messages typically on a periodic basis. The advertising messages are ICMP (Internet Control Message Protocol) router advertisements supplemented with an agent-specific extension (Mobility Agent Advertisement Extension). The foreign agents FA transmit in their advertising messages one or more care-of addresses.

The mobile node MN can also send an agent solicitation in order to find out the possible agents in the network. On the basis of the advertising messages transmitted by the agents the mobile node MN finds out whether it is in the home network HN or in a visited network VN.

When the mobile node MN detects to be in its own home network HN, it operates without Mobile IP functions. If the mobile node MN proceeds to its home network HN while being registered in some other network VN, the mobile node MN can deregister from its primary home agent PHA.

When the mobile node MN is in the visited network VN, the mobile node MN can obtain a care-of address from the advertising messages sent by foreign agents FA. The mobile node MN can also acquire a care-of address without a foreign agent FA, for instance from a DHCP (Dynamic Host Configuration Protocol) server. In this case, unlike in FIG. 2, MN is the termination point of a tunnel TN. MN can thus have Mobile IP services also in networks where no foreign agents FA are available.

Figure 3:
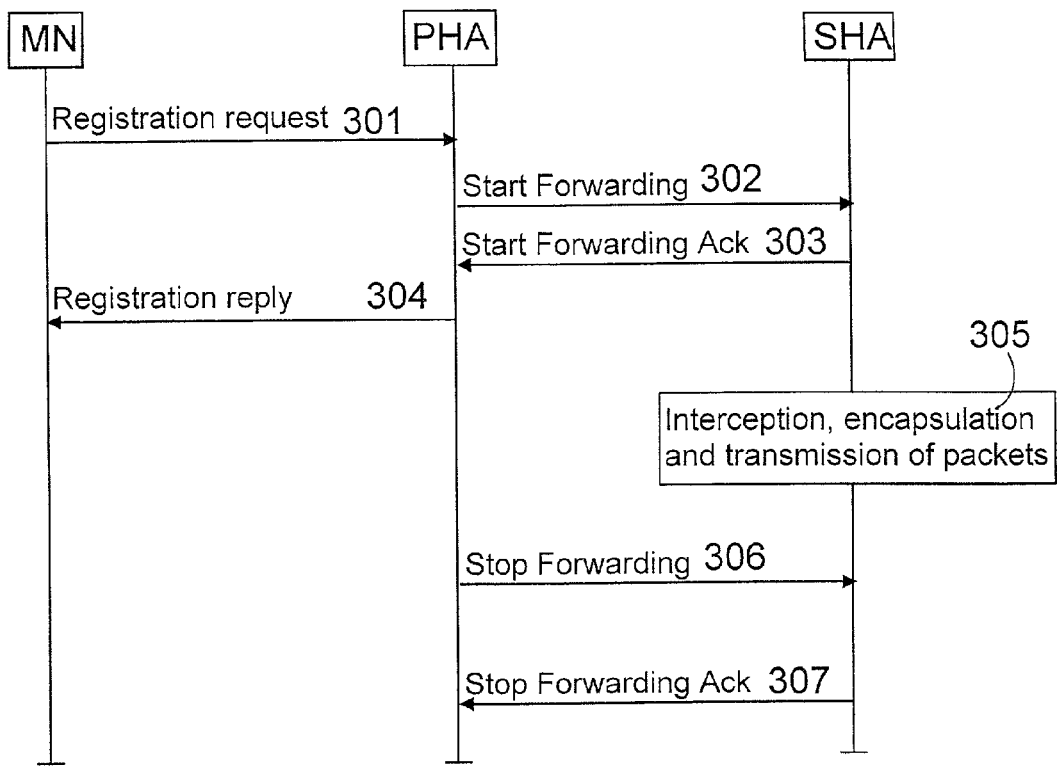
FIG. 3 illustrates by a signal chart the operation of one preferred embodiment of the invention.

Reference is now made to FIG. 3, which illustrates the use of a primary home agent PHA and a secondary home agent SHA in accordance with one preferred embodiment. When a mobile node MN knows a care-of address, it transmits 301 a registration request to the primary home agent PHA either directly or via a foreign agent FA. The registration request 301 comprises the home address of the mobile node MN, the address of the primary home agent PHA and the care-of address. The foreign agent FA maintains a visitor list on the basis of the registration requests transmitted by the mobile nodes MN. The primary home agent PHA is arranged to process all Mobile IP messages (from the foreign agent FA or the mobile node MN), and when needed, to transmit messages to a secondary home agent SHA.

When the primary home agent PHA receives a registration request, it processes and possibly accepts it. If the registration request is acceptable, PHA updates the COA list it maintains by adding mobility binding and its lifetime to the mobile node MN, i.e. by associating the received care-of address with the home address of the mobile node. To balance the load, PHA can delegate the transmission of packets destined for the mobile node MN to the secondary home agent SHA. For this purpose, a routing request (Start Forwarding) comprising at least the home address and the current care-of address of the mobile node MN is sent 302 to the secondary home agent SHA.

PHA can delegate packet transmission by sending routing requests either automatically or on the initiative of the maintenance personnel. Load balancing can be implemented at simplest such that the primary home agent PHA divides the mobile nodes equally among the secondary home agents, i.e. each secondary home agent SHA has the packets of an equal number of mobile nodes to be transmitted. When necessary, other matters can also be considered, for instance, the primary home agent PHA can collect loading information by monitoring the number of packets transmitted and it can delegate packet transmission to secondary home agents SHA when the number of packets increases sufficiently. It is possible to determine a threshold value in the primary home agent PHA for the number of packets to be transmitted. PHA can compare the number of transmitted packets with the predetermined threshold value and if the number of transmitted packets exceeds the predetermined threshold value, PHA can delegate the transmission of packets destined for the mobile node MN to a secondary home agent SHA. Correspondingly, PHA can monitor the number of packets transmitted by the secondary home agents and divide the load as evenly as possible among the secondary home agents.

The secondary home agent SHA modifies its own registers according to the received routing request 302 such that it is able to intercept and encapsulate the packets destined for the mobile node MN and to forward them according to the care-of address. Mobile IP process comprised by the secondary home agent SHA takes care of forming and maintaining mobility bindings according to the messages received from the primary home agents PHA. Thus home addresses and lifetimes of the mobile nodes MN to be served are advantageously stored in the data structures of the Mobile IP process. SHA advantageously updates a link-layer association configuration, such as ARP (Address Resolution Protocol) configuration, and a tunneling configuration and uses them for intercepting and tunneling packets destined for the mobile node MN. The ARP configurations are typically ARP tables that contain data for associating IP addresses to link-layer addresses, such as Ethernet addresses. For instance, proxy ARP and gratuitous ARP techniques can be used: having received a routing request 302, SHA advantageously sends a gratuitous ARP packet, whereby the ARP registers of other nodes in the home network HN are updated. As a consequence, other nodes can associate the IP address of the mobile node MN to the SHA link-layer address. SHA can also start using proxy ARP technique for replying to ARP requests for the mobile node MN link-layer address. ATM networks employ ATMARP protocol which is similar to the ARP protocol employed in Ethernet networks. The tunneling configuration can advantageously utilize a routing table, on the basis of which the encapsulated packets are forwarded. When transmission of packets destined for the mobile node MN starts via the secondary home agent SHA, the routing table must also be updated.

The routing request has advantageously to be acknowledged, i.e. the secondary home agent SHA transmits 303 an acknowledgment (Start Forwarding Ack) to the primary home agent PHA. The acknowledgment 303 advantageously indicates at least whether-the routing request 302 can be implemented. If the routing request has to be acknowleged, PHA can actually accept the registration request 301 and update the COA list only after receiving acknowledgment from SHA stating that said SHA can transmit packets.

If the registration request 301 is acceptable, PHA sends 304 a registration reply to the mobile node MN either via a foreign agent FA or directly. The registration reply comprises necessary codes for informing the mobile node MN about the status of the registration request and information on how long the registration will be honoured by the primary home agent PHA. The lifetime of the registration can be shorter than the one possibly requested for, originally.

After registration, the secondary home agent SHA can intercept the packets destined for the mobile node MN and tunnel them, i.e. encapsulate the packets according to the care-of address and send them to the foreign agent FA or directly to the mobile node MN 305. SHA monitors IP destination addresses of the received packets in order to see if any of them matches with the home address of the registered mobile node MN. If yes, SHA tunnels the packets to the care-of address. When encapsulating the packets, the secondary home agent SHA adds a new header field, a tunnel header, to the IP packets. Tunneling between the secondary home agent SHA and a tunnel termination point (foreign agent FA or mobile node MN) defined by the care-of address can be implemented such that the termination point in accordance with the Mobile IP protocol believes to receive the packets from a conventional home agent in accordance with the Mobile IP protocol. The secondary home agent SHA sets the care-of address as the destination address in the tunnel header of the encapsulated packets, and according to a preferred embodiment, the address of the primary home agent PHA as the source address. Packet encapsulation can be implemented by any of a plurality of encapsulation algorithms, which include, for instance, so-called IP-within-IP encapsulation and so-called minimal encapsulation. By default, at least IP-within-IP encapsulation is supported wherein the original IP address field of the packet is preceded by a new tunnel header.

When receiving an encapsulated packet, the foreign agent FA decapsulates it and resolves the original destination address. On the basis of the original destination address the packet can be transmitted to the mobile node MN. The packets tunneled directly to the mobile node MN are decapsulated by MN itself. If the tunnel termination point, i.e. the care-of address, changes, the primary home agent PHA conveys information on the changed address to SHA which starts using the new care-of address when encapsulating packets destined for the mobile node MN. It is also possible that the secondary home agent SHA uses its own address as the source address of the encapsulated packets. This requires changes in the Mobile IP protocol, however.

According to one preferred embodiment of the invention, the secondary home agent SHA receiving a routing request transmits the packets destined for the mobile node MN until the primary home agent PHA sends 306 a stop forwarding request. The stop forwarding request is sent if the mobility binding to the mobile node is released or if the allowed registration lifetime expires. The request identifies the mobile node MN whose mobility binding is concerned, advantageously on the basis of the home address. The secondary home agent SHA can advantageously send 307 an acknowledgment message (Stop Forwarding Ack), whereby the secondary home agent SHA stops intercepting and tunneling the packets destined for the mobile node MN.

According to one embodiment, a routing request (Start Forwarding) to be sent to a secondary home agent SHA comprises data on the duration of packet forwarding. SHA stores the data in a mobility binding register for a mobile node MN and stops forwarding packets to the mobile node MN when the time indicated in the data expires. The data on the duration of the packet forwarding is advantageously the mobility binding lifetime, i.e. the registration lifetime honoured by the primary home agent PHA. In this case, the stop forwarding request 306 and its acknowledgment 307 are not needed. However, it is recommendable to use both above-described methods combined, i.e. to convey information on the duration of packet forwarding to the secondary home agent SHA and to support the sending of stop forwarding requests.

The above-described messages to be conveyed between the primary home agent PHA and the secondary home agent SHA can advantageously be implemented by utilizing a user datagram protocol UDP, whereby a specific UDP port is reserved for the messages. In addition, the primary home agent PHA advantageously comprises a retransmission mechanism, thanks to which the routing requests or the possible stop forwarding requests can be retransmitted if no acknowledgment is received to previously sent messages. The existing Mobile IP binding can be modified, for instance, for a new lifetime, both in the primary home agent PHA and in the secondary home agent SHA.

The messages transmitted between the home agents PHA and SHA and the agents PHA and FA are advantageously authenticated, so that possible malicious users could not disrupt the operation of the agents by sending false messages. Three authentication extensions are defined in Mobile IP: the mobile-home authentication extension (obligatory), the mobile-foreign authentication extension and the foreign-home authentication extension. The primary home agent PHA can utilize said extensions in connection with registration requests and registration replies in a manner defined in Mobile IP. The messages between the primary home agent PHA and the secondary home agent SHA can be authenticated, for instance, by means of an IPSec (IP Security) protocol.

Since the packets transmitted by the secondary home agent SHA look at the care-of address as if they were transmitted by the primary home agent PHA, there is no need to change Mobile IP. Thus the primary home agents PHA and the secondary home agents SHA according to the preferred embodiment are compatible with the Mobile IP devices.

The advantage is achieved with the solution of one preferred embodiment of the invention that the load of the primary home agents PHA can be balanced very flexibly, even on the move, even though the mobile nodes MN were registered already. The primary home agent PHA can balance the load automatically, which reduces the need for maintenance personnel. The system administrator can readily add new secondary home agents to share the load just by changing the primary home agent settings. This saves a laborious task of changing the settings of mobile nodes MN. Since the handling of actual Mobile IP messages requires considerably less processing capacity than the interception and tunneling of packets, the primary home agent PHA can serve a considerable number of mobile nodes. This enables a considerable addition of new mobile nodes for the same primary home agent to serve.

Figure 4:
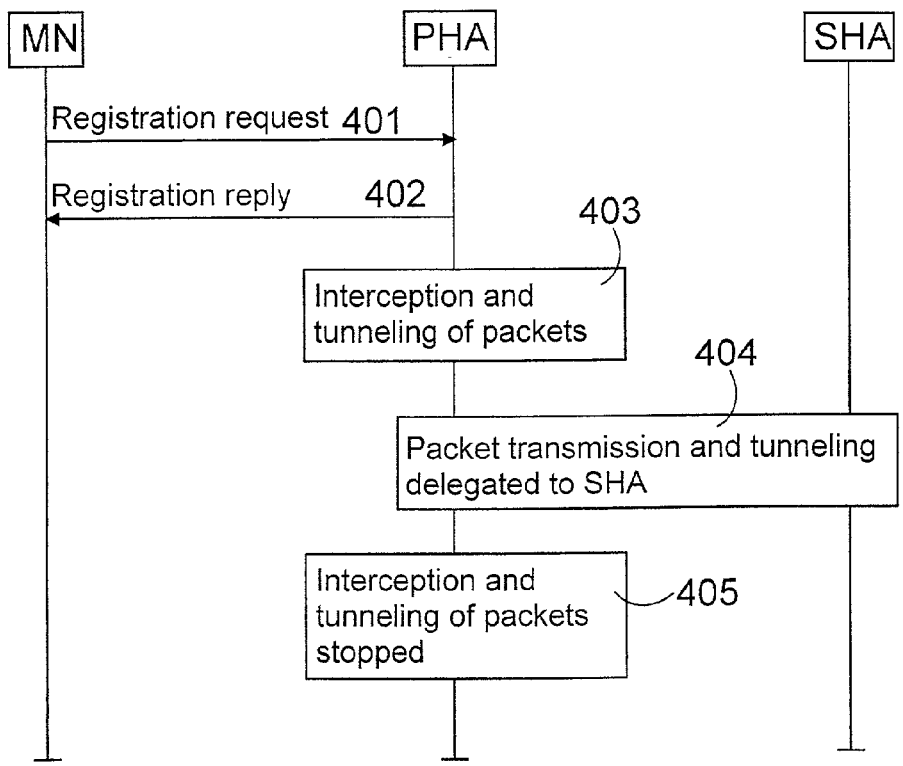
FIG. 4 illustrates by a signal chart the operation of a second preferred embodiment of the invention.

FIG. 4 illustrates another preferred embodiment, in which the primary home agent PHA itself first transmits packets to a mobile node MN. When the primary home agent PHA receives 401 a registration request from the mobile node MN, it can operate as the home agent defined in the Mobile IP. If the registration request is acceptable, PHA can then modify its own registers (e.g. ARP and routing tables) such that it is able to intercept and encapsulate the messages destined for the mobile node MN and to forward them according to a care-of address. PHA advantageously sends a gratuitous ARP packet when accepting the registration request of the mobile node MN, whereby the ARP registers of other nodes in the home network HN are updated. PHA can send 402 a registration reply according the care-of address of the registration request either to the mobile node MN or to a foreign agent FA. In this way the packets destined for the mobile node MN can be transmitted, i.e. intercepted and tunneled 403, very quickly after receiving the registration request 401.

The primary home agent PHA can later on delegate 404 the interception and tunneling of packets to a secondary home agent SHA. This can be implemented advantageously by messages (302, 303) between the primary home agent PHA and the secondary home agent SHA as illustrated in FIG. 3. In the earlier described manner, the secondary home agent SHA can thus be arranged to intercept and tunnel the packets destined for the mobile node MN. The primary home agent PHA advantageously stops 405 intercepting and tunneling the packets only after receiving an acknowledgment message (Stop Forwarding Ack) from the secondary home agent SHA, because it can then be sure that the packets of the mobile node MN are transmitted to the correct destination. In view of packet transmission, no problems arise even though both of the agents PHA, SHA would succeed in transmitting the same packet to the mobile node MN, because the IP protocol allows duplicated packets. It does not make sense for the primary home agent PHA to delete the tunnel created for the mobile node MN, because a link-layer address of the primary home agent PHA may still remain in the ARP cache of any one of the devices in the home network HN as the link-layer address of the mobile node MN. Since it is possible that PHA sent ARP messages just before sending a routing message (Start Forwarding), it makes sense for the secondary home agent SHA to resend the gratuitous ARP message shortly after sending the routing message. In this way it is possible to ensure that the ARP caches of other devices in the home network HN are in real time. By means of this embodiment it is possible to avoid the delays that the message exchange between the primary home agent PHA and the secondary home agent SHA and errors may cause.

On returning to the home network HN, the mobile node MN can perform deregistration in accordance with Mobile IP directly in the primary home agent PHA. PHA sends then a stop forwarding request to the secondary home agent SHA and the mobility binding of the mobile node MN can be released in the primary home agent PHA and the secondary home agent SHA.

The above-described functionality is applicable for use in systems employing IPv4 (IP version 4). However, the primary home agent PHA and the secondary home agent SHA can also be applied in devices supporting IPv6 protocol, whereby it is possible to utilize mobile IPv6. The mobile IPv6 has the same basic principle, i.e. the home agent transmits packets to a current care-of address of the mobile node MN. The mobile IPv6 does not require entities similar to foreign agents FA, but the mobile nodes MN acquire their care-of addresses themselves, for instance by means of Address Autoconfiguration. As regards a more detailed description of the prior art mobile IPv6, reference is made to the IETF Internet draft "Mobility support in IPv6" (work in progress).

According to one preferred embodiment, in mobile IPv6 the mobile node MN informs the primary home agent PHA of the care-of address by using IPv6 options of data packets instead of separate registration messages. The primary home agent PHA can delegate the transmission of packets destined for the mobile node MN to the secondary home agent SHA advantageously by means of previously described messages.

SHA (or PHA) can execute the actual packet transmission by using a so-called neighbour discovery ND mechanism of IPv6, instead of ARP, in packet interception and by tunneling with the assistance of any IPv6 encapsulation techniques. The neighbour discovery configurations and IPv6 tunneling configurations are then defined in the secondary home agent SHA, which employs said configurations when transmitting the packets to the mobile node MN advantageously using the address of the primary home agent PHA as the source address of the encapsulated packets. Proxy ND and gratuitous ND, which provide functions similar to the proxy ARP and the gratuitous ARP, are defined in the neighbour discovery mechanism. Mobile IPv6 employs authentication according to IPSec protocol.

The primary home agent PHA and the secondary home agent SHA can be implemented in any device providing the above-described Mobile IP functionality. They can be a separate node, a part of a router or a part of equipment constituting a virtual private network VPN. Since load balancing is concerned, in physical terms PHA and SHA are typically located in separate devices, between which there is an operational connection. The operation of the primary and the secondary home agents PHA, SHA can advantageously be implemented as software to be executed in a processor of a device comprising an agent.

It is obvious to a person skilled in the art that with the progress of technology the basic idea of the invention can be implemented in a variety of ways. Thus, the invention and its embodiments are not restricted to the above-described examples but they may vary within the scope of the claims.

The invention claimed is:

1. A method for balancing load in a telecommunications system supporting Mobile IP, the system including at least one primary home agent configured to support mobility of at least one mobile node and capable of intercepting and tunneling packets, the method comprising:
    adding one or more secondary home agents to the telecommunications system, in addition to the at least one primary home agent;
    processing, in the primary home agent, registration requests, sent from the at least one mobile node or a foreign agent serving the mobile node in a visited network;
    transmitting packets destined for the at least one mobile node via the primary home agent in response to receiving an acceptable registration request from the at least one mobile node or the foreign agent;
    sending a routing request to the one or more secondary home agents to transmit packets destined for the at least one mobile node;
    intercepting and tunneling packets destined for the at least one mobile node by the one or more secondary home agents in response to the routing request; and
    stopping packet transmission to the at least one mobile node via the primary home agent.

2. The method of claim 1 further comprising:
    updating Address Resolution Protocol and tunneling configurations of the one or more secondary home agents supporting IPv4 protocol, or neighbor discovery configurations and tunneling configurations of the one or more secondary home agents supporting IPv6 protocol, and
    intercepting and tunneling the packets destined for the at least one mobile node using the updated Address Resolution Protocol and tunneling configurations or the neighbor discovery and tunneling configurations.

3. The method of claim 1, further comprising:
    collecting loading information by monitoring a number of packets transmitted by the primary home agent; and
    transmitting packets destined for the at least one mobile node via the one or more secondary home agents to balance the load in response to a number of transmitted packets being transmitted by the primary home agent exceeding a predetermined threshold value.

4. The method of claim 1, further comprising:
    using the primary home agent's Internet Protocol address as a source address of packets transmitted from the one or more secondary home agents and the mobile node's care-of address as a destination address.

5. The method of claim 1, further comprising:
    sending a stop forwarding request to the one or more secondary home agents if a mobility binding to the at least one mobile node is released or a registration lifetime of the mobile node expires; and
    stopping the packet transmission to the at least one mobile station via the one or more secondary home agents in response to the stop forwarding request.

6. The method of claim 1, further comprising:
    sending information indicating a duration of packet transmission to the one or more secondary home agents, and
    stopping the packet transmission to the at least one mobile node via the secondary home agents if a duration indicated in the sent information expires.

7. A telecommunications system comprising:
    at least one primary home agent configured to support mobility of one or more mobile nodes and capable of intercepting and tunneling packets; and
    at least one secondary home agent, in addition to the primary home agent,
    the telecommunications system being configured to transmit packets destined for the at least one mobile node via the at least one secondary home agent when needed, wherein the primary home agent is configured to process registration requests sent from the at least one mobile node or a foreign agent serving the at least one mobile node in a visited network, the primary home agent is configured to transmit packets destined for the at least one mobile node in response to receiving an acceptable registration request from the at least one mobile node or the foreign agent, the primary home agent is configured to send a routing request to the at least one secondary home agent to transmit packets destined for the at least one mobile node the at least one secondary home agent is configured to intercept and tunnel packets destined for the at least one mobile node in response to the routing request, and the primary home agent is configured to stop packet transmission to the at least one mobile node.

8. The telecommunications system of claim 7, wherein the at least one secondary home agent supports IPv4 protocol and is configured to update its Address Resolution Protocol and tunneling configurations, or the at least one secondary home agent supports IPv6 protocol and is configured to update its neighbor discovery configurations and tunneling configurations in response to the routing request, and at least one secondary home agent is arranged to intercept and tunnel the packets destined for the at least one mobile node using the updated Address Resolution Protocol and tunneling configurations or the neighbor discovery and tunneling configurations.

9. The telecommunications system of claim 7, wherein the primary home agent is configured to collect loading information by monitoring number of packets it transmitted, and the telecommunications system is configured to balance a load by transmitting the packets destined for the at least one mobile node via at least one secondary home agent in response to the number of transmitted packets transmitted by the primary home agent exceeding a predetermined threshold value.

10. The telecommunications system of claim 7, wherein the primary home agent is configured to send a stop forwarding request to the at least one secondary home agent if a mobility binding with the at least one mobile node is released or a registration lifetime of the mobile node expires, and the at least one secondary home agent is configured to stop the packet transmission to the at least one mobile node in response to the stop forwarding request.

11. A telecommunications device comprising at least one primary home agent configured to support mobility of one or more mobile nodes and capable of intercepting and tunnelling packets; wherein the primary home agent is configured to process registration requests sent from the at least one mobile node or a foreign agent serving the at least one mobile node in a visited network, the primary home agent is configured to transmit packets destined for the at least one mobile node in response to receiving an acceptable registration request from the at least one mobile node or the foreign agent; the primary home agent is configured to send a routing request to the at least one secondary home agent to transmit packets destined for the at least one mobile node; and the primary home agent is configured to stop packet transmission to the at least one mobile node.

12. The telecommunications device according to claim 11, wherein the primary home agent is configured to collect loading information by monitoring number of packets it transmitted, and the primary home agent is configured to delegate transmission of the packets destined for the at least one mobile node via the at least one secondary home agent in response to the number of transmitted packets transmitted by the primary home agent exceeding a predetermined threshold value.

13. The telecommunications device according to claim 11, wherein the primary home agent is configured to send a stop forwarding request to the at least one secondary home agent if a mobility binding with the at least one mobile node is released or a registration lifetime of the mobile node expires.

14. A telecommunications device comprising at least one secondary home agent configured to transmit packets destined for at least one mobile node when needed, wherein the secondary home agent is configured to receive a routing request from a primary home agent capable of intercepting and tunneling packets to transmit packets destined for the at least one mobile node in response to receiving an acceptable registration request from the at least one mobile node or a foreign agent serving the at least one mobile node in the visited network, and the secondary home agent is configured to intercept and tunnel packets destined for the at least one mobile node in response to the routing request;

wherein the secondary home agent supports IPv4 protocol and is configured to update its Address Resolution Protocol and tunneling configurations, or the at least one secondary home agent supports IPv6 protocol and is configured to update its neighbor discovery configurations and tunneling configurations in response to the routing request, and at least one secondary home agent is arranged to intercept and tunnel the packets destined for the at least one mobile node using the updated Address Resolution Protocol and tunneling configurations or the neighbor discovery and tunneling configurations.

15. The telecommunications device according to claim 14, wherein the secondary home agent is configured to use the primary home agent's Internet Protocol address as a source address of packets transmitted from the secondary home agent and the mobile node's care-of address as a destination address.

* * * * *